United States Patent [19]

Heinzler et al.

[11] Patent Number: 4,672,315
[45] Date of Patent: Jun. 9, 1987

[54] CIRCUIT ARRANGEMENT FOR MONITORING A THYRISTOR

[75] Inventors: Franz Heinzler; Wolfgang Führer, both of Erlangen, Fed. Rep. of Germany

[73] Assignee: Siemens Aktiengesellschaft, Berlin and Munich, Fed. Rep. of Germany

[21] Appl. No.: 753,245

[22] Filed: Jul. 9, 1985

[30] Foreign Application Priority Data

Jul. 17, 1984 [DE] Fed. Rep. of Germany ....... 3426769

[51] Int. Cl.[4] .............................................. G01R 31/26
[52] U.S. Cl. ............................... 324/158 SC; 340/645; 340/653
[58] Field of Search ......................... 324/133, 158 SC; 340/635, 645, 653

[56] References Cited

U.S. PATENT DOCUMENTS 4,025,845  5/1977  Lhommelet et al. ............... 324/133

FOREIGN PATENT DOCUMENTS 103182  3/1984  European Pat. Off. ............ 340/635
3210484  9/1982  Fed. Rep. of Germany ...... 324/158 SC
150005  9/1982  Japan ............................ 324/158 SC
43175  3/1983  Japan ............................ 324/158 SC
1130982  12/1984  U.S.S.R. ...................... 324/158 SC
1146770  3/1985  U.S.S.R. ............................... 340/645

OTHER PUBLICATIONS

HGU-Ventilentwicklung "etz", No. 45, vol. 2, Dec. 1981, pp. 1338-1342.
IEEE Trans. Ind. Electr. & Contr. Instrum., Arrillaga, J., et al., "Fast ON/OFF Detection of Silicon-Controlled Rectifiers . . . ", vol. IECI-26, No. 1, Feb. 1979, pp. 22-26.

Primary Examiner—Reinhard J. Eisenzopf
Assistant Examiner—Stephen M. Baker
Attorney, Agent, or Firm—Kenyon & Kenyon

[57] ABSTRACT

A circuit arrangement for monitoring a thyristor comprising an auxiliary thyristor disposed between the anode terminal and gate terminal the thyristor, and a signal generator device which contains a light-emitting diode for sending light signals to an evaluating device. In order to obtain a particularly simple and therefore functionally reliable design of the circuit arrangement, due to the elimination of a separate energy supply circuit, and to achieve emission of light signals with a particularly high light output, the signal generator device has a first pair of input terminals coupled in series with the auxiliary thyristor and the light-emitting diode is arranged between the input terminals of the signal generator device.

10 Claims, 1 Drawing Figure

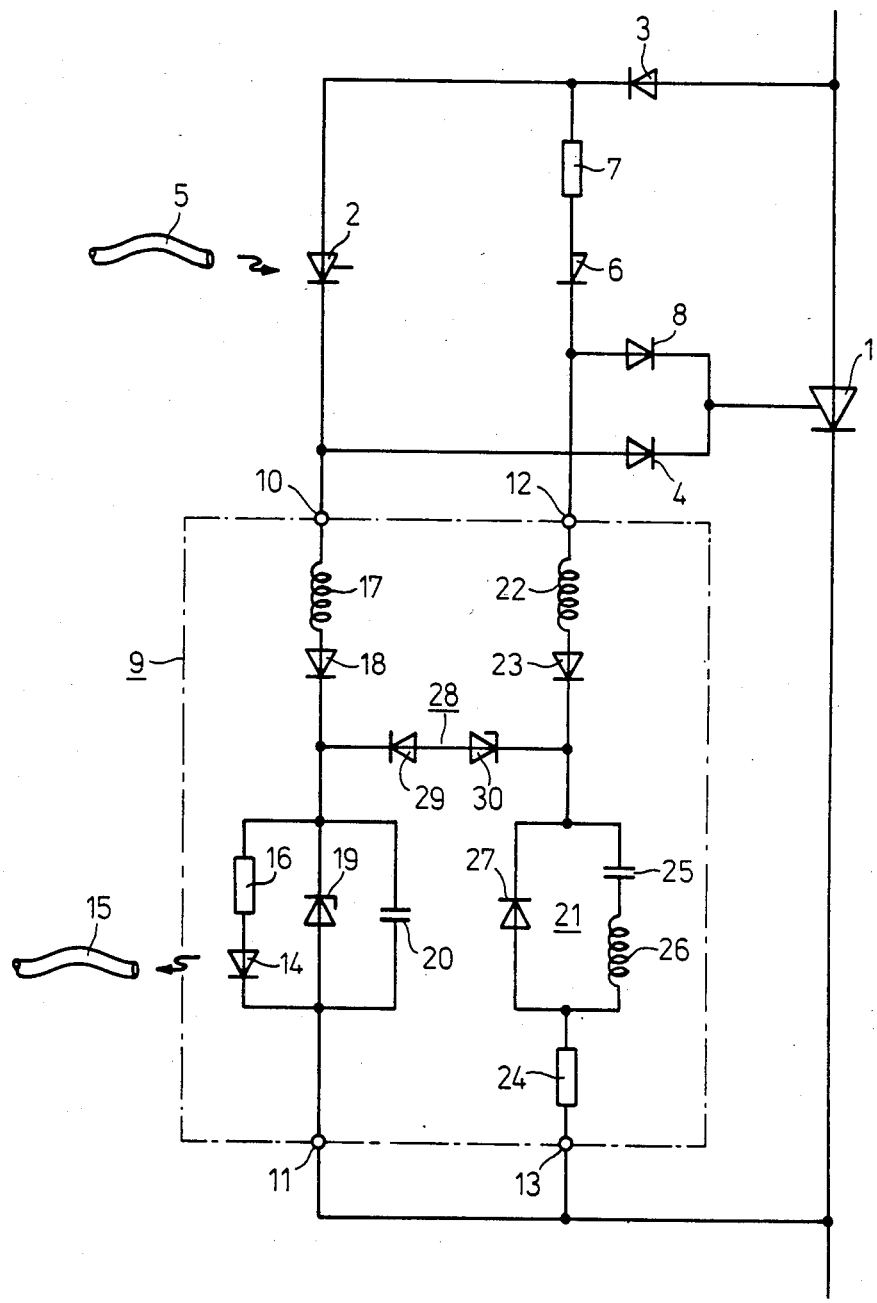

4,672,315

CIRCUIT ARRANGEMENT FOR MONITORING A THYRISTOR

BACKGROUND OF THE INVENTION

The present invention relates to a circuit arrangement for monitoring a thyristor, and particularly to a circuit arrangement having an auxiliary thyristor disposed between the anode terminal and the gate terminal of the thyristor and further comprising a signal generator device which contains a light-emitting diode for sending light signals to an evaluation device.

From "etz" no. 45, vol. 2, Dec. 1981, page 1341f, FIG. 7, a circuit arrangement for monitoring a thyristor is known. The known circuit arrangement is part of thyristor-section electronics associated with the thyristor. The electronic thyristor section circuitry has a power supply circuit of its own for supplying power to it and is supplied via the latter from an auxiliary energy pickup circuit which is arranged, in series with a damping resistor and a damping capacitor, parallel to the thyristor. For monitoring this thyristor, the electronic thyristor section circuitry contains a signal generator device with an ohmic voltage divider which is connected parallel to the thyristor, and to the divider tap of which a signal processing circuit is connected; the latter is followed by a light emitter with a light-emitting diode which, when addressed, sends light signals to an evaluating device via a light guide. The thyristor is likewise addressed by light signals, for which purpose the electronic thyristor section circuitry contains a light signal receiver which is connected on the output side to the gate terminal of the thyristor via a control pulse generating circuit. The above publication further mentions the possibility for addressing the thyristor, its combination with an auxiliary thyristor which can be fired by light, the auxiliary thyristor being connected between the anode terminal and the gate terminal of the thyristor.

SUMMARY OF THE INVENTION

It is therefore an object of the present invention to provide a circuit arrangement for monitoring a thyristor with an associated auxiliary thyristor which is of particularly simple and therefore reliable design because a power supply circuit of its own is omitted and makes possible the emission of light signals with a particularly high light output.

According to the invention, the signal generator device of the circuit arrangement of the type mentioned above is connected with its input terminal in series with the auxiliary thyristor and the light-emitting diode is arranged between the input terminals of the signal generator device.

The thyristor is monitored by sending out a light signal to the evaluation device as soon as the thyristor receives a firing signal from the auxiliary thyristor, for making the transition from the nonconducting operating state to the conducting operating state. The advantage of the circuit arrangement according to the invention consists in that the energy of the voltage applied thereto immediately prior to the firing of the thyristor is utilized for addressing the light-emitting diode to send in a light signal when the thyristor is fired by means of the associated auxiliary thyristor. A separate power supply circuit for supplying the circuit arrangement according to the invention is therefore not necessary. Furthermore, light signals of particularly high light output can be generated in the light-emitting diode by the direct utilization of the energy of the voltage at the thyristor prior to the firing instant, so that also more cost-effective light guides with relatively high attenuation can be used for transmitting the light signals to the evaluating device.

In an advantageous further embodiment of the circuit arrangement according to the invention, a resistor is connected in series with the light-emitting diode between the input terminals of the signal generator device; a capacitor is arranged in shunt to the series circuit consisting of the series resistor and the light-emitting diode. The capacitor is charged, after the auxiliary thyristor fires, by the voltage at the thyristor via the auxiliary thyristor and is thereupon discharged via the series resistor and the light-emitting diode; the light-emitting diode delivers a light signal to the evaluating device, the duration of which is essentially determined by the time constant of the capacitor and the series resistor.

It is of advantage to arrange in shunt to the capacitor a voltage limiting element, so that a current flow through the light-emitting diode takes place, when the auxiliary thyristor is fired, which is independent of the instantaneous magnitude of the voltage at the thyristor immediately prior to the firing of the latter, and thereby, light signals with always the same light output are emitted every time. In addition, an overload of the light-emitting diode is prevented by the voltage limiting element.

The signal generator device of the circuit arrangement according to the invention can advantageously be arranged with its input terminals between the anode terminal and the gate terminal of the thyristor; as soon as the auxiliary thyristor receives a firing system signal for firing the thyristor, it becomes conducting so that the firing current for the thyristor flows through the light-emitting diode.

It is particularly advantageous to design the circuit arrangement according to the invention in such a way that the signal generator device is arranged with its input terminals between the cathode terminal of the auxiliary thyristor which is in connection with the gate terminal of the thyristor, and the cathode terminal of the thyristor; as soon as the auxiliary thyristor receives a firing signal for firing the thyristor, it becomes conducting and connects the input terminals of the signal generator device to the voltage present at the thyristor at the instant of firing, so that a particularly large current flow through the light-emitting diode is made possible for emitting a light signal.

In a further advantageous embodiment of the circuit arrangement according to the invention, an inductance is connected in series with the light-emitting diode between the input terminals of the signal generator device. Thereby, a short delay of the current flow through the light-emitting diode is achieved immediately after the firing of the auxiliary thyristor, so that initially a sufficiently large firing current can flow into the thyristor via the auxiliary thyristor before a current flow into the capacitor and through the light-emitting diode takes place. In this manner, reliable firing of the thyristor is always assured.

It is generally customary and also known, for instance, from the above-mentioned publication, that a threshold voltage switching element (usually a sweep voltage diode or a break-over diode) is connected between the anode terminal and the gate terminal of the thyristor in order to make possible protective firing of the thyristor. The signal generator device of the circuit arrangement according to the invention then can be arranged with its input terminals between the anode terminal and the gate terminal of the thyristor in such a manner that it is connected in series at the same time with the auxiliary thyristor and the threshold voltage switching element, respectively. In this manner, the light emitting diode is addressed for emitting a light signal, in the case of an operationally normal firing of the thyristor, by the auxiliary thyristor as well as in the case of a protective firing, by the threshold voltage switching element.

If the signal generator device is arranged with its input terminals between the gate terminal and the cathode terminal of the thyristor, a particularly advantageous design of the circuit arrangement according to the invention is obtained if the signal generator device is connected with other input terminals in series with the threshold-voltage switching element between the anode terminal and the cathode terminal of the thyristor; if the signal generator device contains a tuned circuit which is arranged between the further input terminals; and if the tuned circuit is connected via an energy output branch to the series circuit consisting of the series resistor and the light-emitting diode. This embodiment of the circuit arrangement according to the invention provides the advantageous possibility to send out different light signals depending on whether an operational firing of the thyristor via the auxiliary thyristor or a protective firing of the thyristor via the threshold voltage switching element took place. If the thyristor is fired operationally via the auxiliary thyristor, a light signal in the form of a single light pulse is generated in the light-emitting diode. In case of a protective firing of the thyristor, on the other hand, the energy of the voltage at the thyristor is fed to the tuned circuit which gives off this energy over several oscillations via the energy output branch for driving the light-emitting diode; the light-emitting diode therefore emits several light pulses, the spacing in time of which is determined by the resonance frequency of the tuned circuit.

Decoupling of the first input terminals and of the further input terminals of the signal generator device from each other is accomplished advantageously by the provision that the auxiliary thyristor and the threshold-voltage switching element are connected via an electronic valve element to the gate terminal of the thyristor. It is achieved thereby that in firing the auxiliary thyristor as well as during the transition of the threshold voltage switching element into a current-conducting state, the thyristor is fired; at the same time, however, the light-emitting diode is driven only directly when the thyristor is being fired by the auxiliary thyristor and, if the thyristor is fired by the threshold-voltage switching element, is driven only indirectly via the tuned circuit.

Reliable firing of the thyristor by the threshold-voltage switching element is assured by the provision that a further inductance is connected in series with the tuned circuit between the further input terminals of the signal generating device. The further inductance causes a delay of the current flow into the tuned circuit so that, immediately after the transition of the threshold-voltage switch into the current-conducting state, a sufficiently large firing current can initially flow into the thyristor before the tuned circuit is excited.

Advantageously, the tuned circuit contains a series circuit consisting of a tuned-circuit capacitor and a tuned-circuit inductance as well as a bypass diode connected in shunt to this series circuit; in the energy output branch, a diode is arranged in such a manner that it is connected in series with the light-emitting diode and antiparallel to the bypass diode. The bypass diode, together with the diode in the energy pickup branch, makes possible free oscillations of the tuned circuit, where the energy oscillating in the tuned circuit generates, during each oscillation period, a current flow through the bypass diode in one-half the oscillation period and during the respective other half oscillation period, a current flow through the energy output branch and the light-emitting diode.

In a further advantageous embodiment of the circuit arrangement according to the invention, the energy output branch contains a further threshold voltage switching element connected in series with the diode, because thereby, the number of light pulses of the light signal can be predetermined which are to be emitted by the light-emitting diode in the case of a protective firing of the thyristor by the further threshold-voltage switching element. To this end, the further threshold-voltage switching element is designed so that, after the predetermined number of light pulses are emitted, the energy in the tuned circuit is no longer sufficient to make possible further current flow to the light emitting diode through the energy output branch.

BRIEF DESCRIPTION OF THE DRAWING

To explain the invention, a preferred embodiment of the circuit arrangement according to the invention is shown in the single drawing figure.

DETAILED DESCRIPTION

The drawing shows a thyristor 1 which, for instance, together with further thyristors, can be arranged in a valve branch of a converter arrangement. An auxiliary thyristor 2 is associated with thyristor 1 and is connected in series with a protective diode 3 and an electronic valve element 4 between the anode terminal and the gate terminal of the thyristor 1. The auxiliary thyristor 2 is a thyristor which can be fired by light which is optically coupled at the one line end of a light guide 5 shown only sectionwise; the other line end of the light guide 5 is connected to a light transmitter, not shown. The thyristor 1 is furthermore associated with a threshold voltage switching element 6 which is arranged in series with the protective diode 3, a protective resistor 7 and a further electronic valve 8 between the anode terminal and the gate terminal of the thyristor 1. The threshold-voltage switching element 6 may comprise a sweep voltage diode (breakover diode). The embodiment shown of the circuit arrangement according to the invention contains a signal generator device 9 which is connected with input terminals 10 and 11 in series to the auxiliary thyristor 2 between the anode terminal and the cathode terminal of the thyristor 1 and is arranged, with further input terminals 12 and 13, in series with the threshold voltage switching element 6 between the anode terminal and the cathode terminal of the thyristor 1. The signal generator device 9 contains a light-emitting diode 14 which is optically coupled at the line end of a further light guide 15 (only shown sectionwise), the other end of the light guide 15 being connected to an evaluating device, not shown. The light-emitting diode 14 is arranged in series with a resistor 16 between the input terminals 10 and 11 of the signal generating device 9 and is connected to input 10 via an inductance 17 and a further protective diode 18.

Parallel to the series circuit consisting of the light-emitting diode 14 and the series resistor 16 are connected a voltage limiting element 19 and a capacitor 20. A tuned circuit 21 is arranged in series with a further inductance 22, an additional protective diode 23 and a protective resistor 24 between the further input terminals 12 and 13 of the signal transmitter device 9. The tuned circuit 21 contains a tuned-circuit capacitor 25, a resonant circuit inductance 26 in series therewith and a bypass diode 27 which is shunted across the series circuit consisting of the tuned circuit capacitor 25 and the tuned-circuit inductance 26. The tuned circuit 21 is connected via an energy output branch 28 to the series circuit consisting of the light-emitting diode 14 and the series resistor 16. The energy output branch 28 contains a diode 29 and a further threshold-voltage switching element 30 connected in series thereto, the diode 29 being arranged so that it is connected antiparallel to the bypass diode of the tuned circuit 21 in series with the light-emitting diode 14. The further threshold voltage switching element 30 can comprise, for instance, a Zener diode or a sweep voltage diode. As soon as the direction of the voltage applied to the thyristor 1 coincides with its conduction direction, the thyristor 1 can be fired. Operational firing of the thyristor 1 is accomplished by emitting a light pulse from the light transmitter, not shown, to the auxiliary thyristor 2. As soon as the latter becomes conducting, the voltage at the thyristor 1 causes a pulse-shaped current to flow through the auxiliary thyristor 2. Part of this current pulse flows via the electronic valve 4 to the gate terminal of thyristor 1 and causes the latter to be fired. The remaining part of the current pulse flows into the signal generator device 9 via the input terminal 10 and causes, besides a current flow through the light-emitting diode 14, particularly the charging of the capacitor 20. The voltage limiting element 19 prevents the voltage at the series circuit consisting of the light-emitting diode 14 and the series resistor 16 from exceeding a predetermined value, so that the light-emitting diode 14 is protected against overload. At the end of the current pulse through the auxiliary thyristor 2, the capacitor 20 is discharged through the light-emitting diode 14 and its series resistor 16, the discharge current being converted in the light-emitting diode into a light signal. The duration of the light signal depends substantially on the time constant of the capacitor 20 and the series resistor 16.

Protective firing of the thyristor 1 is always necessary if a normal operative firing has not taken place and the voltage at the thyristor 1 threatens to exceed a maximum value which results in the destruction of the thyristor 1. The threshold-voltage switching element 6 has a threshold voltage which is smaller than the permissible maximum value at the thyristor 1. As soon as the voltage at the thyristor 1 and thereby, the voltage at the threshold voltage switching element 6 exceeds the predetermined threshold value, the threshold voltage switching element 6 changes to a conducting state, so that a pulse-shaped current flows through the threshold voltage switching element 6. Part of this current pulse flows via the electronic valve 8 to the gate terminal of the thyristor 1 and causes the latter to fire. The remaining part of the current pulse flows via the inductance 22 and the protective diode 23 into the tuned circuit 21 and via the energy output branch 28 through the light-emitting diode 14. The bypass diode 27 and the diode 29 in the energy output branch 28 make it possible for the tuned circuit 21 to oscillate freely, whereby the current in the tuned circuit 21 flows through the bypass diode 27 during half an oscillation period; during the respective following half oscillation period, the current flows back again into the tuned circuit 21 through the light-emitting diode 14, so that the light-emitting diode 14 emits a light signal every cycle. The further threshold-voltage switching element 30 is designed so that after a predetermined number of light pulses is emitted, the energy in the tuned circuit 21 is no longer sufficient to make possible the further current flow via the energy output branch 28 for the light-emitting diode 14.

If the evaluating device does not receive light signals from the light-emitting diode 14, this indicates a defective (alloyed through) thyristor 1. In this case, no voltage can appear at the thyristor 1, so that also no energy for driving the light-emitting diode 14 is available.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A circuit arrangement for monitoring a first thyristor comprising an auxiliary thyristor disposed between the anode terminal and gate terminal of said first thyristor, signal generator means comprising a light-emitting diode for sending light signals to an evaluating device, said signal generator means having a first pair of input terminals coupled in series with the auxiliary thyristor, said light-emitting diode being coupled between said input terminals of the signal generator means, the input terminals of the signal generator means being arranged between the cathode terminal of the auxiliary thyristor and the cathode terminal of the first thyristor, said cathode terminal of the auxiliary thyristor coupled to the gate terminal of the first thyristor.

2. The circuit arrangement recited in claim 1 further comprising a series resistor coupled in series with the light-emitting diode between said input terminals of the signal generator means, and a capacitor arranged parallel to the series circuit comprising said series resistor and said light-emitting diode.

3. The circuit arrangement recited in claim 2, further comprising a voltage limiting element arranged in shunt with the capacitor.

4. The circuit arrangement recited in claim 1, wherein the input terminals of the signal generator means are coupled between the anode terminal and the cathode terminal of the first tyristor.

5. The circuit arrangement recited in claim 1, further comprising an inductance coupled in series with the light-emitting diode between the input terminals of the signal generator means.

6. The circuit arrangement recited in claim 5, further comprising a threshold voltage switching element coupled between the anode terminal and the gate terminal of the first thyristor, the signal generator means further comprising a further pair of input terminals coupled in series with said threshold-voltage switching element between the anode terminal and the cathode terminal of the first thyristor, the signal generator means further comprising a tuned circuit which is arranged between the further input terminals, the tuned circuit coupled via an energy output branch to the series circuit comprising the light-emitting diode and the series resistor.

7. The circuit arrangement recited in claim 6, wherein the auxiliary thyristor and the threshold voltage switching element are coupled via respecptive electronic valve elements to the gate terminal of the first thyristor.

8. The circuit arrangement recited in claim 6, further comprising a further inductance coupled in series with the tuned circuit between the further input terminals of the signal generator means.

9. The circuit arrangement recited in claim 6, wherein the tuned circuit comprises a series circuit comprising a tuned-circuit capacitor and a tuned-circuit inductance and further comprising a bypass diode connected in shunt acorss said tuned circuit capacitor and tuned circuit inductance, and further comprising an additional diode arranged in said energy output branch such that it is connected in seried with the light-emitting diode and antiparallel to the bypapss diode.

10. The circuit arrangement recited in claim 9, wherein the energy output branch further comprises a threshold voltage switching element coupled in series with said additional diode.

* * * * *